(12) United States Patent
Hohn

(10) Patent No.: US 6,213,295 B1
(45) Date of Patent: Apr. 10, 2001

(54) MULTIPLE GAME CALL HOLDER DEVICE

(76) Inventor: Phillip Hohn, 3227 Hackamore Dr., Hayward, CA (US) 94541

(*) Notice: Subject to any disclaimer, the term of this patent is extended or adjusted under 35 U.S.C. 154(b) by 0 days.

(21) Appl. No.: 09/510,508

(22) Filed: Feb. 22, 2000

(51) Int. Cl.$^7$ .................................................. B65D 85/20
(52) U.S. Cl. ........................ 206/315.1; 206/446; 220/741; 248/315
(58) Field of Search ............................... 206/315.1, 372, 206/373, 446, 303, 427, 428, 217; 220/737, 738, 741; 248/315, 311.2

(56) References Cited

U.S. PATENT DOCUMENTS

| | | | |
|---|---|---|---|
| 2,029,051 | * 1/1936 | Blevins | 248/315 |
| 4,560,064 | * 12/1985 | Petersen et al. | 206/158 |
| 4,621,734 | * 11/1986 | Heijnen et al. | 206/427 |
| 4,733,808 | 3/1988 | Turner, Jr. et al. | |
| 4,889,376 | * 12/1989 | Nagy | 248/315 |
| 4,911,300 | * 3/1990 | Colonna | 206/427 |
| 4,947,991 | * 8/1990 | Snell | 206/427 |
| 5,111,981 | 5/1992 | Allen . | |
| 5,244,430 | 9/1993 | Legursky . | |
| 5,607,091 | 3/1997 | Musacchia . | |
| 5,643,039 | 7/1997 | McIntyre . | |
| 5,738,217 | * 4/1998 | Hunter | 206/549 |
| 5,820,000 | 10/1998 | Timberlake et al. | |
| 5,947,353 | 9/1999 | Johnson . | |
| 5,967,391 | 10/1999 | Hunt . | |

* cited by examiner

Primary Examiner—Paul T. Sewell
Assistant Examiner—Shian Luong
(74) Attorney, Agent, or Firm—Richard C. Litman

(57) ABSTRACT

A game call holder device which enables the hunter to access a game call unit readily from a bundle or plurality of game calls.

2 Claims, 2 Drawing Sheets

MULTIPLE GAME CALL HOLDER DEVICE

BACKGROUND OF THE INVENTION

1. Field of the Invention

The present invention relates generally to a game call holder device which enables the hunter to access a game call unit readily from a bundle or plurality of game calls.

2. Description of the Related Art

The related art of interest describes various game call holders and tying down devices. There is a need for bundling game calls with a device to enable ready retrieval of a specific game call without untangling the lanyards holding the game call units. The related art will be discussed in the order of perceived relevance to the present invention.

U.S. Pat. No. 5,820,000 issued on Oct. 13, 1998, to Mark Timberlake et al. describes a dual game call holder for a hunter's wrist comprising a wrist strap having a D-ring on one end and hook and loop fastening patches on the opposite end. In the median portion of the wrist strap are two aligned game call holders comprising a loop and an elastic cord and cord clamp for holding each cylindrical game call. The dual game call holder is distinguishable for its different holding structure consisting of a loop and an elastic cord clamp.

U.S. Pat. No. 4,733,808 issued on Mar. 29, 1988, to Dan B. Turner, Jr. et al. describes a fowl hunting call holder device and the method of using the device attachable about the hunter's wrist and comprising a flexible strap having one or two expandable strips for securing the fowl calls. The wrist strap is secured by Velcro adhesive strips. The call holder is distinguishable for attachment to one's wrist.

U.S. Pat. No. 5,111,981 issued on May 12, 1992, to Melvin L. Allen describes a game call holder for mounting on the hunter's chest comprising a nylon pile fastener support with two nylon pile fastener straps, an alligator clip on the uppermost edge for attachment to a collar, and a nylon pile fastener shoulder strap attached to a longitudinal edge of the support. The game call holder is distinguishable for its reliance on nylon pile fastener attachments to hold the game call, to attach to the hunter's collar, and to hold on the hunter's chest.

U.S. Pat. No. 5,244,430 issued on Sep. 14, 1993, to Roy A. Legursky describes a turkey caller and support apparatus comprising a support assembly having three arm straps with hook and loop fasteners. The turkey caller support apparatus is distinguishable for holding only one game call on a hunter's arm.

U.S. Pat. No. 5,607,091 issued on Mar. 4, 1997, to John Musacchia describes a universal game call adapter and holder device for attachment by a strap on a hunter's knee. The game call is distinguishable for its singular game call structure.

U.S. Pat. No. 5,643,039 issued on Jul. 1, 1997, to David J. McIntyre describes a deer grunt game call having a tubular mouthpiece and sound tube. A lanyard is attached to the mouthpiece with a tuning clip and holds another tuning clip. The game call device is distinguishable for its lack of a holder structure.

U.S. Pat. No. 5,947,353 issued on Sep. 7, 1999, to Reid P. Johnson describes a turkey call holding leg harness comprising a pair of buckled straps entrapped between a bolted rigid mounting plate and a slotted face plate. The call holder is distinguishable for its specific scabbard structure to be mounted on a hunter's leg.

U.S. Pat. No. 5,967,391 issued on Oct. 19, 1999, to Charles D. Hunt describes a game call holder for an archer hunter which fits on either arm. An elastic band has three elastic securing loops positioned in the shape of a Y. The game call holder is distinguishable for its limitation to securing only one game call which must be positioned on the archer's arm.

None of the above inventions and patents, taken either singularly or in combination, is seen to describe the instant invention as claimed. Thus, a multiple game call holder device solving the aforementioned problem is desired.

SUMMARY OF THE INVENTION

The present invention is directed to a game call holder device, made up of pairs of flexible rings at each end of a main body, which enables the hunter to access a chosen game call unit readily from a bundle or plurality of game calls.

Accordingly, it is a principal object of the invention to provide a polyurethane-rubber game call holder which has a pair of flexible rings at each end of a main body for insertion of two game call devices.

It is another object of the invention to provide a game call holder which has tabs on each flexible ring for enabling the positioning of the holder on a game call.

It is a further object of the invention to provide a game call holder having a thickened main body for stabilization.

Still another object of the invention is to provide a game call holder adapted to bundle at least two game calls on one centered game call device.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
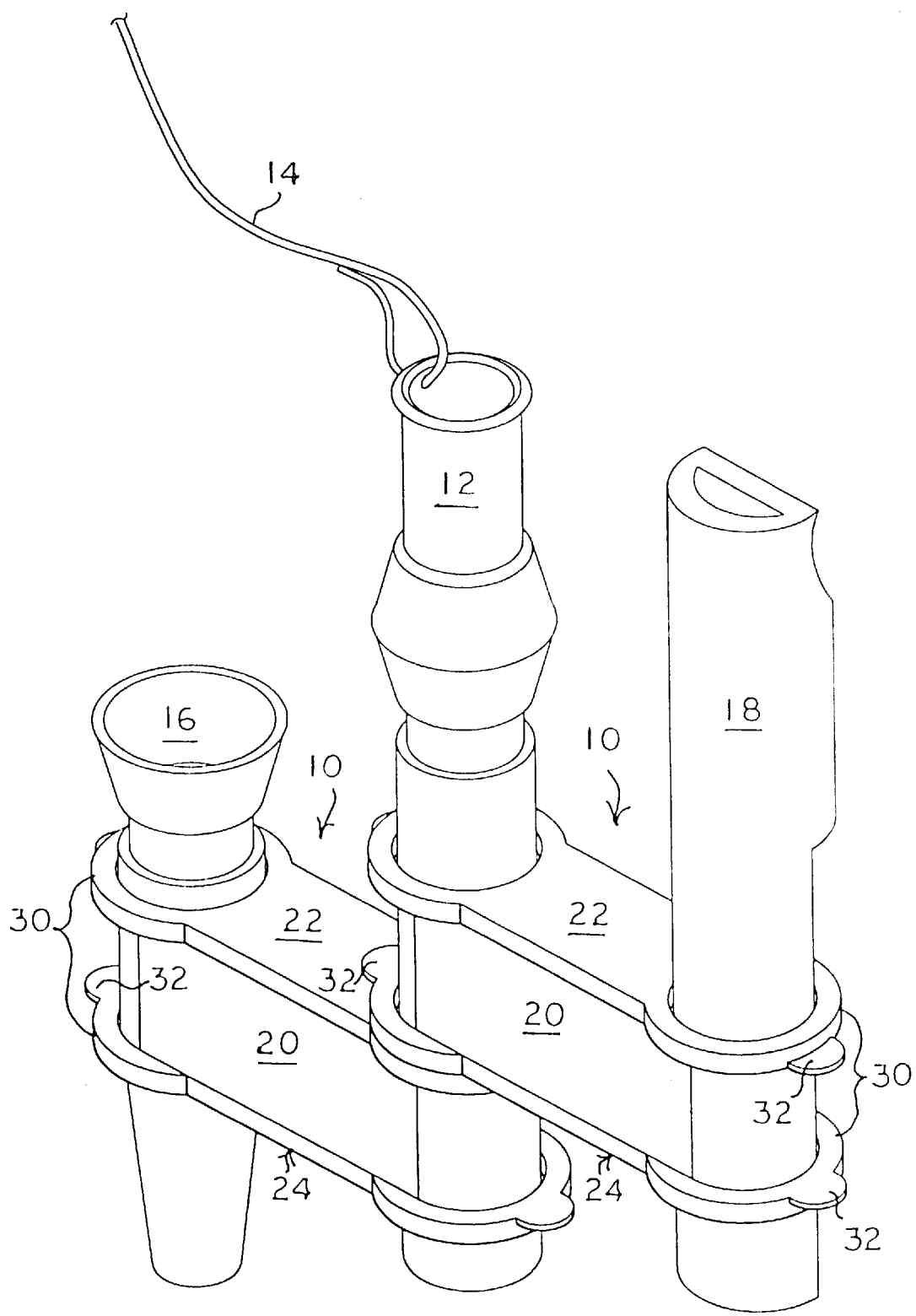
FIG. 1 is an environmental, elevational view of a multiple game call holder device attached to multiple game call units according to the present invention.

The present invention is directed to a multiple game call holding device 10 shown in FIG. 1 attached in tandem as a pair of holding devices 10 to a main game call device 12 having a lanyard 14 for hanging around the hunter's neck. Two differently shaped game call devices 16 and 18 are depicted. If the main call device 12 is long enough more holding devices 10 can be employed to aggregate a plurality of game call devices. The game call holder device 10 is preferably made of black polyurethane rubber for its durability and camouflage compatibility.

Figure 2:
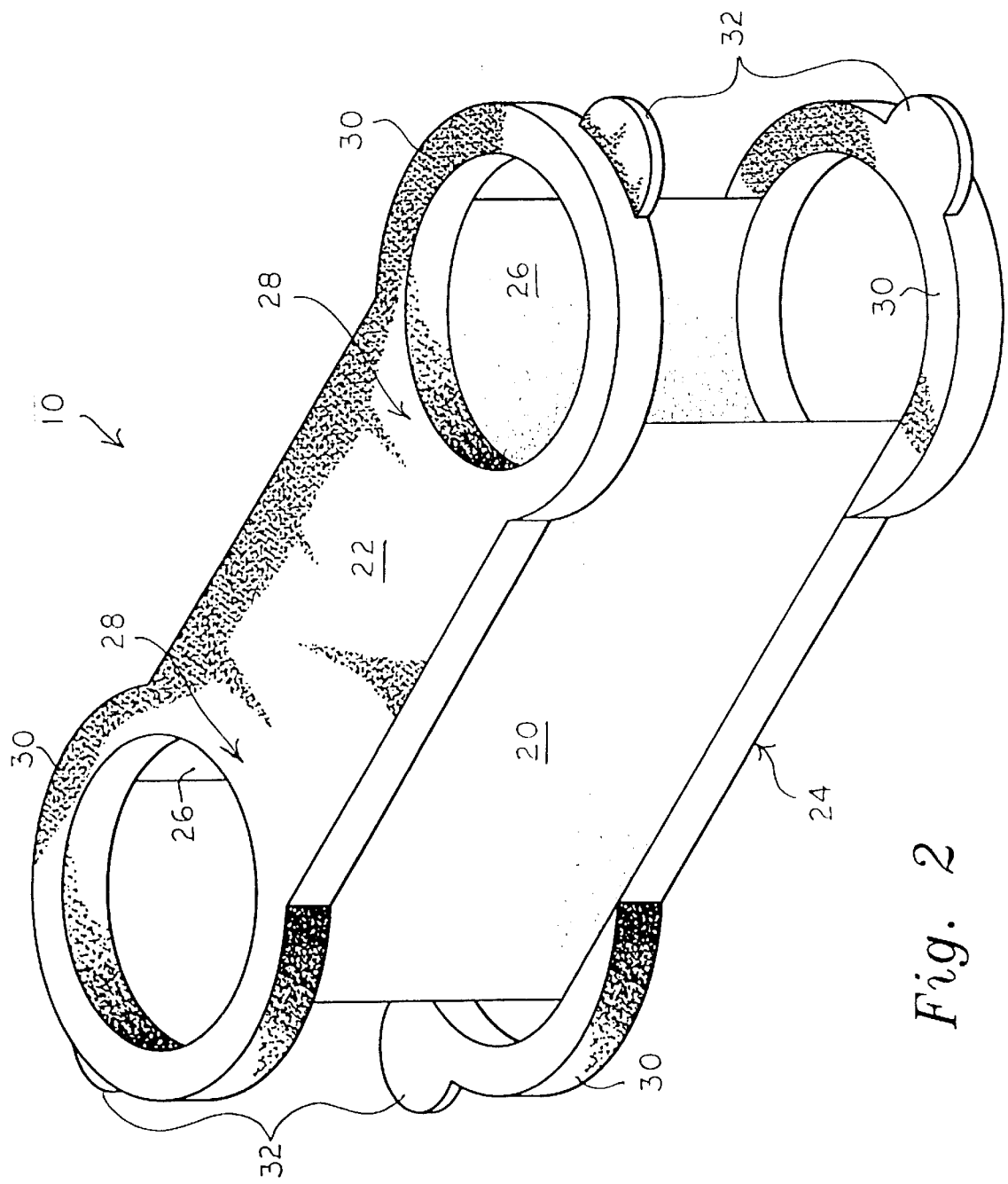
FIG. 2 is a perspective view of the holder device.

As shown in FIG. 2, the multiple game call holder device 10 comprises a thick main body portion 20 having an upper planar surface 22, a bottom planar surface 24, and a concave end portion 26 at each end 28. A pair of elastic rings 30 are positioned at each end of the upper surface 22 of the main body portion 20. Another pair of elastic rings 30 is positioned at each end 28 of the bottom surface 24 of the main body portion 20 so that and the pair of elastic rings 30 on the upper surface 22 of the main body portion 20 are aligned with the pair of elastic rings 30 on the bottom surface 24 of the main body portion 20 for capturing and holding a cylindrical game call device.

Each distal end of an elastic ring 30 has a tab 32 which enables grasping and stretching of the ring 30 for inserting or removing a game call device from the holder device 10.

Thus, a hunter has ready access to two or more game calls at one time instead of encountering the problem of untangling a game call hung by its own lanyard from the other game calls hung normally around the hunter's neck. The time taken to untangle the lanyards and to select the proper game call becomes critical when the specific game is within calling distance temporarily.

It is to be understood that the present invention is not limited to the embodiment described above, but encompasses any and all embodiments within the scope of the following claims.

I claim:

1. A multiple game call holder device comprising:

a thick main body portion having an upper planar surface, a bottom planar surface, and a concave end portion at each end;

a pair of elastic rings at each end of said upper surface of the main body portion;

a pair of elastic rings at each end of said bottom surface of the main body portion; and said pair of elastic rings on the upper surface of the main body aligned with the pair of elastic rings on the bottom surface of the main body portion for capturing and holding a cylindrical game call device.

2. The multiple game call holder device according to claim 1, wherein the distal ends of each elastic ring has a tab.

* * * * *